United States Patent
Becker et al.

(10) Patent No.: US 7,312,417 B2
(45) Date of Patent: Dec. 25, 2007

(54) LASER BEAM SEAM WELDING WITH PRIOR LASER SPOT WELDING

(75) Inventors: Wolfgang Becker, Ulm (DE); Klaus Goth, Sindelfingen (DE); Mike Paelmer, Weil der Stadt (DE); Thomas Stahs, Ulm (DE); Vladan Todorovic, Reutlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/944,033

(22) Filed: Sep. 17, 2004

(65) Prior Publication Data
US 2005/0109740 A1 May 26, 2005

(30) Foreign Application Priority Data
Sep. 19, 2003 (DE) .................. 103 43 465
Nov. 6, 2003 (DE) .................. 103 51 779

(51) Int. Cl.
B23K 26/22 (2006.01)
B23K 26/24 (2006.01)

(52) U.S. Cl. .................. 219/121.64; 219/161
(58) Field of Classification Search .......... 219/121.64, 219/161, 121.63; 228/175
See application file for complete search history.

(56) References Cited

U.S. PATENT DOCUMENTS

| | | | | |
|---|---|---|---|---|
| 5,380,978 A | * | 1/1995 | Pryor | 219/121.64 |
| 5,910,894 A | * | 6/1999 | Pryor | 219/121.64 |
| 6,153,853 A | * | 11/2000 | Maruyama et al. | 219/121.63 |
| 6,703,583 B2 | * | 3/2004 | Menin | 219/121.64 |
| 6,965,091 B2 | * | 11/2005 | Terada et al. | 219/121.63 |
| 2002/0121506 A1 | * | 9/2002 | Menin | 219/121.64 |

FOREIGN PATENT DOCUMENTS

| | | | | |
|---|---|---|---|---|
| DE | EP-333966 A | * | 9/1989 | |
| DE | 44 14 464 C1 | | 12/1995 | |
| DE | 44 39 357 C2 | | 5/1996 | |
| DE | 19605341 A1 | * | 8/1996 | |
| DE | 198 03 734 C2 | | 8/1999 | |
| DE | 100 48 233 A1 | | 4/2002 | |
| JP | 57-117746 A | * | 7/1982 | |
| JP | 60-154891 A | * | 8/1985 | |
| JP | 62-28093 A | * | 2/1987 | 219/121.63 |
| JP | 2-137687 A | * | 5/1990 | |
| JP | 11-347763 A | * | 12/1999 | |
| JP | 2000-343229 A | * | 12/2000 | |

* cited by examiner

*Primary Examiner*—Geoffrey S. Evans
(74) *Attorney, Agent, or Firm*—Akerman Senterfitt; Stephan A. Pendorf; Yonghong Chen

(57) ABSTRACT

During welding with high output power, the gaps between the pieces being joined may not exceed a maximal gap width. A process for laser beam welding is provided, which on the one hand ensures maintaining (not exceeding) a maximal gap width between the sheets and on the other hand makes possible a maximal utilization of the achievable welding speed. The sheets, prior to welding, are first spot welded, wherein they are clamped only during this spot welding in order to ensure the maintenance of a maximum gap width.

6 Claims, 2 Drawing Sheets

LASER BEAM SEAM WELDING WITH PRIOR LASER SPOT WELDING

BACKGROUND OF THE INVENTION

1. Field of the Invention

The invention concerns a process for laser beam welding with prior spot welding (tack welding, riveting). A general process of this type is already known from DE 44 14 464 C1.

2. Related Art of the Invention

When welding with high power density welding processes, in particular laser beam welding, electron beam welding or plasma welding, the gap between the pieces being joined may not exceed a maximum gap width, the width being determined by the particular process and material being joined. This is of particular importance in overlap-welding of body panel sheet metal in automobile construction. For this reason, the sheets of metal must generally be pressed together or clamped very near to the welding site.

Generally, a stationary clamping technique, using a number of clamping elements, is employed for clamping, thereby ensuring that the permissible gap width is not exceeded at each point of the welding seam.

FIG. 1 shows a prior art a mobile clamping technique according to DE 198 03 734 C2. For this, a pressure element 4, which at the same time provides or feeds the welding rod or wire 13, moves over the sheets 11 to be welded and presses these together at point 14. A laser welding head 18 is rigidly connected the pressure element and is oriented rigidly relative thereto, in order for laser beam 21 to melt the welding wire. In this embodiment the clamping and welding speed are coupled and thus slow.

Modern welding processes, for example laser-scanner-welding, can achieve welding speeds that are substantially higher than the moving speed achievable by a coupled welding-clamping device. The latter is also limited by the requirement that the sheets, once aligned upon each other, should not be brought out of alignment by transmission of impulses.

In DE 44 14 464 C! it is proposed to completely dispense with clamping techniques. The sheets are basically super-imposed, then riveted with multiple spot-welds using a laser along the length of the intended welding seam, and thereafter are welded.

This process may be satisfactory for flat sheets. It has been found by experience, however, that in the case of complex geometry gap-widths occur which cannot be closed without clamping techniques.

SUMMARY OF THE INVENTION

It is thus the task of the present invention to provide a process for laser beam welding, which on the one hand ensures the maintenance of a maximal gap width between the sheets and, on the other hand, makes possible a maximum utilization of the achievable welding speed.

The characteristics of the inventive process for laser beam welding in accordance with the invention are discussed in greater detail below.

With regard to the process to be developed, this task is inventively solved in that at least two sheets necessary for welding are positioned in the necessary relationship to each other, thereafter they are spot-welded with a laser beam, thereafter welded with a laser beam, wherein this process involves multiple alternating local spot welding and local welding, wherein the sheets to be spot welded are locally clamped by means of a tensioning device in the manner that it is ensured that locally a predetermined maximal gap width between the sheets is not exceeded.

This inventive process embodiment has the advantage that the movement of the tensioning device and the welding beam are decoupled from each other so that the former does not limit the latter. Clamping occurs only there where there is to be spot welding, and only at the time that spot welding is to take place. Thus the duration of clamping, that is, the time of application of force and the dwell time or pause time, is minimized.

Beyond this, remaining within the maximal gap width is maintained at all times, that is, during spot welding the gap is maintained by the clamping device and during welding the gap width is maintained by the spot weld.

Beyond this, the laser work time is better utilized in comparison to DE 44 14 464 C1, since there is not an initial carrying out of all spot welding followed by having the laser beam return the entire path to the initial welding spot in order to begin with the welding, but rather, the laser beam directly, after spot welding, without detour, begins with the welding process—without however requiring a clamping device for this welding.

In a preferred embodiment of the inventive process the clamping device is moved to the next local spot welding site during the local welding.

Thereby the total process time is reduced.

In a particularly preferred embodiment of the invention the displacement (movement) of the clamping device occurs with reduced force against the sheet metal, or without pressure force. Thereby the danger of the misalignment of the sheets, already aligned relative to each other, by transmission of unintended impulses or bumps of the clamping device is minimized.

In a further advantageous embodiment of the process the spot welding occurs by forming at least one elongated welding seam, and preferably approximately 2 to 5 mm in length (depending upon the material strength, laser power, welding speed, return spring (spring back) force, etc.). Frequently, the gap width and the forces opposing the clamping when considered together are together are so large, that a certain minimum spot weld area is necessary in order to prevent a ripping apart of the spot welded seam.

The spot welded seam and the welding seam can be positioned independently from each other depending upon the characteristics of the vehicle part, that is, the spot seam can lie completely outside of the latter seam, the former can cross over the latter or overlap or could even constitute a complete segment of the latter.

Therein it is particularly preferred when the elongated rivet seam is perpendicular to the latter welding seam, since thereby the total rigidity of the joined area is maximized.

Alternatively, the latter welding seam can be bordered (flanked) by two spot weld seams extending along the left and right side, preferably perpendicular to the welding seam.

In a further advantageous embodiment of the process, spot welding and welding occur by means of a laser scanner. A laser scanner has a particularly rapid and flexible beam deflection device, for example a mirror system (comprised of at least one single-axis or multi-axial controllable pivotable mirror, see for example DE 100 27 148 A1) or acoustic-optical modulator.

The biggest advantage is comprised therein, that the easily programmable scanner device can steer the laser beam in very short time intervals to almost any desired processing track over the surface to be processed, and thus can easily follow in particular also very precisely defined changes in the welding speed or complicated designs of lateral beam movement paths. The alternating between spot welding and welding is possible in accordance with the invention in rapid and simple manner with a laser scanner, and this makes possible an almost continuous utilization of the laser output.

BRIEF DESCRIPTION OF THE DRAWINGS

In the following the inventive process will be described in greater detail on the basis of the figures and the illustrative examples, wherein.

DETAILED DESCRIPTION OF THE INVENTION

Figure 1:
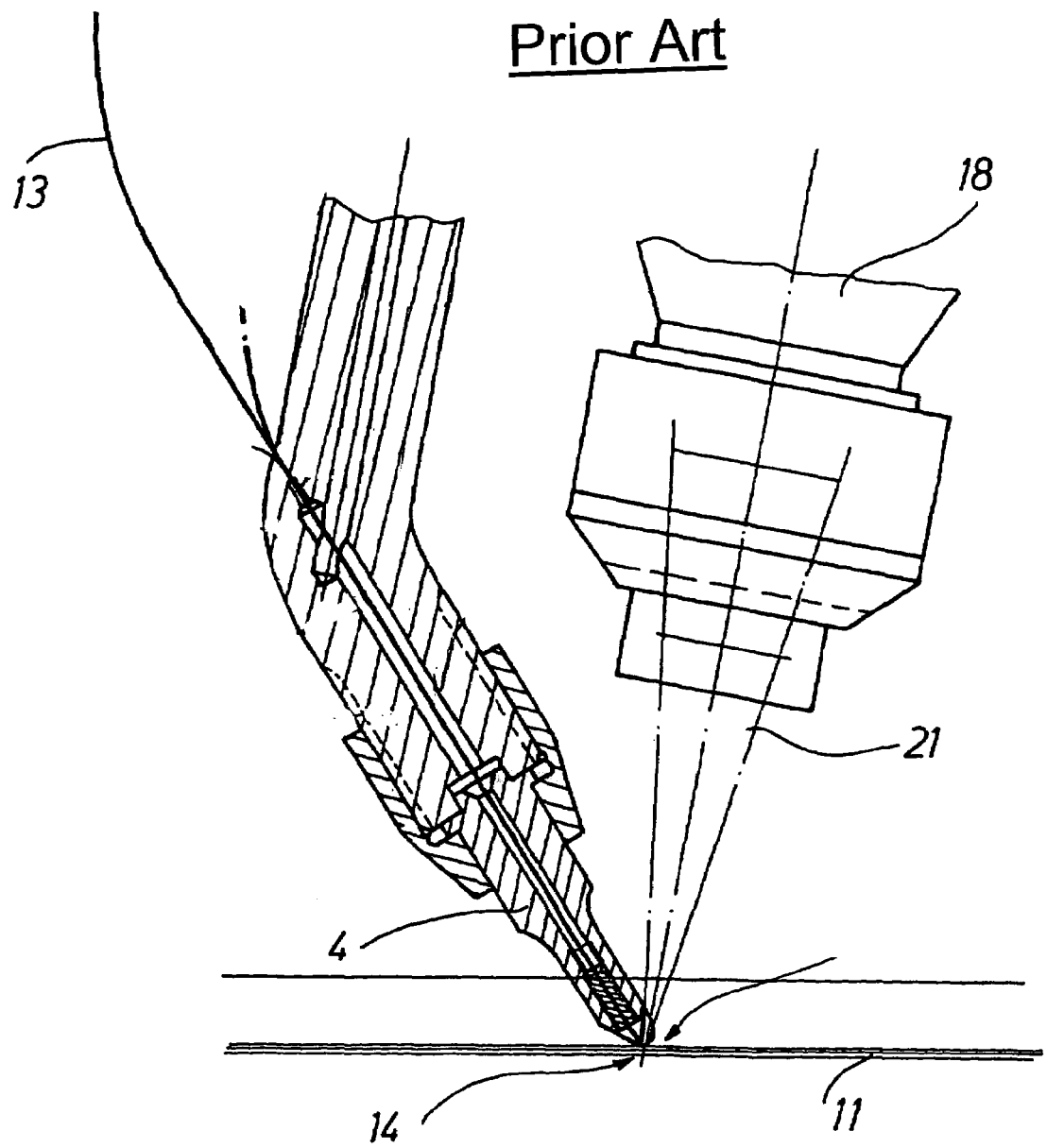
FIG. 1 shows a prior art sheet metal welding device with joined clamping device and welding device
Figure 2:
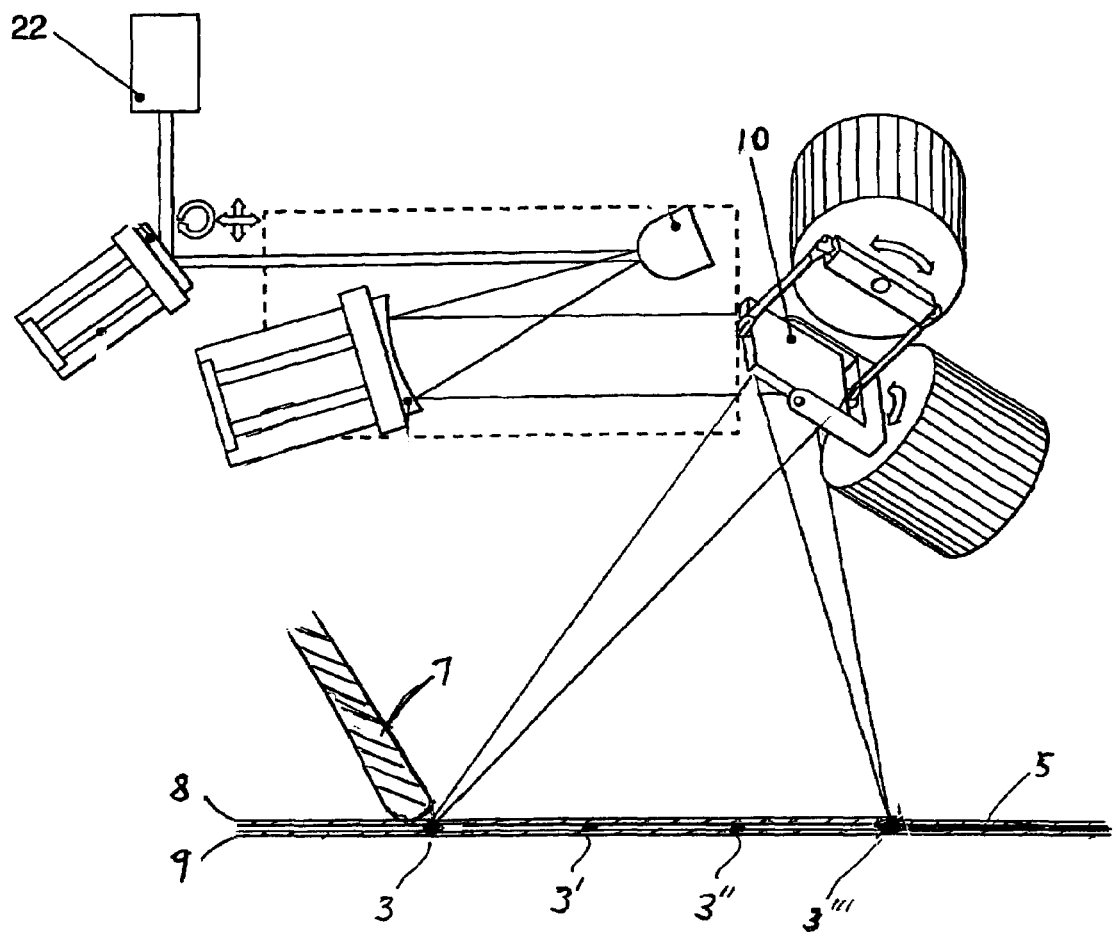
FIG. 2 shows the process and device according to the present invention wherein welding device and clamping device are de-coupled.

FIG. 2 shows a laser device according to DE 100 27 148, discussed above, further modified to include pressure element 7 according to the present invention. Laser 22 emits a beam which is focused in a first mirror, aimed by two axis scanning mirror 10 so as to focus at a focal point below pressure element 7 to create weld spots 3, 3', 3", 3'" on one of two sheets 8, 9 such that the sheets are maintained in spaced relationship for welding. Scanning mirror is able to conduct welding to create a continuous seam 5 in the area between tack-welds 3, 3', 3", 3'". In a first illustrative embodiment two steel sheets 8, 9 are oriented relative to each other and the intended welding seam is defined. A scanner device travels smoothly over it and guides a laser beam over the surface to be processed. The scanner device is comprised of a three-dimensional pivotable computer-controlled mirror system 10. The scanner device has approximately 300 mm distance to the surface of the sheet, the focus of the laser is upon the surface to be welded. The laser power is approximately 3500 Watt, the welding speed is approximately 5 meters per minute.

The clamping device is guided along the intended welding seam without application of pressure. As soon as an intended welding seam is reached, it presses the two sheets together for a short period of time. The duration of tensioning is approximately 50 ms and is just adequate, in order to locally weld an elongated spot weld seam of approximately 4 mm length and approximately 0.5 mm width. The spot weld seam is perpendicular to the direction of movement of the tensioning device (and to the main axis of the actual welding seam).

After spot welding, the clamping device is released and without application of force is moved with high speed to the next spot weld site approximately 50 mm away. During this time, in the direct vicinity of the first spot weld, that is, with a material and process specific maximal separation to the rivet seam (here approximately 10 mm) being maintained, the sheets is welded for the actual joining. For this, the laser beam is moved by means of the scanner device from the end of the spot weld seam to the beginning of the welding seam.

The welding seam can have any desired shape, as long as it exhibits a sufficient length and strength, in order to ensure a permanent joining of the sheets. It has been found that the shape of a rolling rounded brackets ("parenthesis") (e.g., an ellipse left open by approximately a quarter along the main axis) is particularly useful. This rounded bracket is welded in the manner that its main axis is perpendicular to the orientation of the spot weld seam, which is located in the center of the bracket. The rounded bracket has a length of approximately 12 mm and a width of approximately 5 mm. Approximately 300 ms are needed for welding this seam, during which the clamping device is moved to the next spot weld site.

Alternatively however a straight seam of approximately 20 mm length can be welded perpendicular through the spot weld seam and extend along the outside equally on both sides.

According to a different embodiment, on each joint side respectively two spot weld seams are welded of approximately 2 mm in length, perpendicular to the direction of movement of the tensioning device, spaced apart by approximately 20 mm. This separation is sufficiently small, so that the clamping device need not be removed and re-clamped, in order to ensure that the maximum gap width is not exceeded. Following the welding of the two spot weld seams the tensioning device is released and moved to the next joining location. During this time the above described rounded bracket, or even only a straight line centrally between the two rivet seams, is welded.

According to a third embodiment coated sheets are welded. These are provided on the sides facing each other with burls or nubs (minimal topographical change or relief of approximately 100 μm in height). Thereby, even in the tensioned or clamped condition, a minimal distance between the sheets is provided, through which the coating, when vaporizing during welding, can easily escape. The riveting and welding of the coated sheet metal occurs analogous to the above described illustrated embodiments.

The inventive process as described in the above illustrated examples has been found particularly suitable for laser welding of steel sheet metal in the automobile industry.

In particular, a significant reduction in joining times can be achieved thereby, with simultaneous ensuring of joining quality.

The invention claimed is:

1. A process for laser beam welding of at least two pieces of sheet metal comprising:
    positioning the pieces of sheet metal relative to each other as necessary for welding,
    thereafter locally clamping the sheet metal at a first location using a clamping device suitable for spot welding,
    thereafter locally spot welding with a laser beam in such a manner that locally a predetermined maximal gap width between the sheets is ensured,
    immediately after the spot welding, releasing the clamping device and moving the clamping device to a second location, wherein the clamping occurs only during the spot welding,
    thereafter locally seam welding with the same laser beam,
    wherein the process involves alternating between local spot welding and local seam welding multiple times until the entire metal sheets are welded.

2. The process according to claim 1, wherein during the local seam welding the clamping device is moved to the next location.

3. The process according to claim 2, wherein the relocation of the clamping device occurs with reduced pressure on the sheets or without application of pressure.

4. The process according to claim 1, wherein the spot welding forms an elongated seam.

5. The process according to claim 1, wherein the spot welding and the seam welding occur using a laser scanner.

6. A process for laser beam welding of at least two pieces of sheet metal comprising:
    positioning the pieces of sheet metal relative to each other as necessary for welding,
    thereafter locally clamping the sheet metal at a first location by a clamping device prior to spot welding in such a manner that locally a predetermined maximal gap width between the sheets is ensured, thereafter locally spot welding with a laser beam in the area in which the maximal gap width between the sheets is ensured by clamping, immediately after the spot welding, removing the clamping device from areas which have been spot welded and in which locally a predetermined maximal gap width between the sheets is ensured, and moving the clamping device to a second location, wherein the clamping occurs only during the spot welding, thereafter locally seam welding with the same laser beam between the spot welds in the area in which a predetermined maximal gap width between the sheets is ensured by the spot welds, wherein the process involves alternating the location of spot welding and the location of seam welding multiple times until the entire metal sheets are welded.

* * * * *